June 20, 1967     E. V. SAHRBACKER     3,327,196
VARIABLE SPEED CONTROL FOR POWER HAND TOOLS AND THE LIKE
Filed April 1, 1965     4 Sheets-Sheet 1
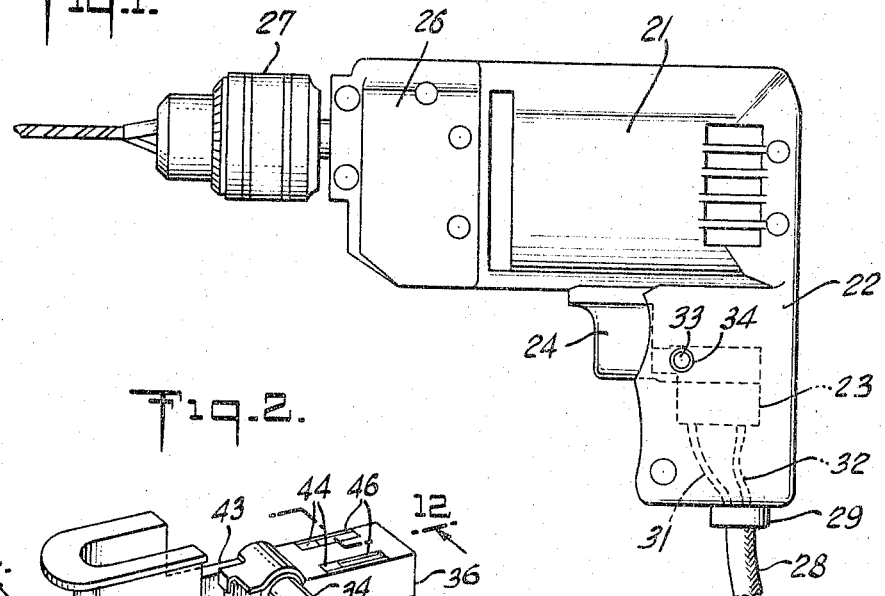
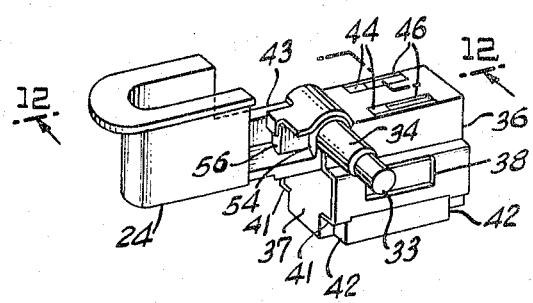
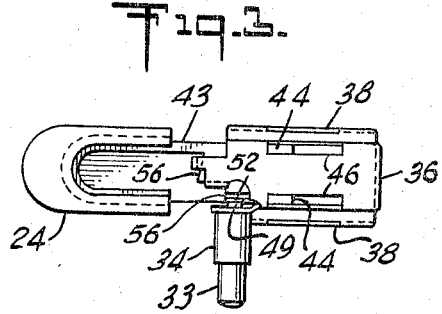
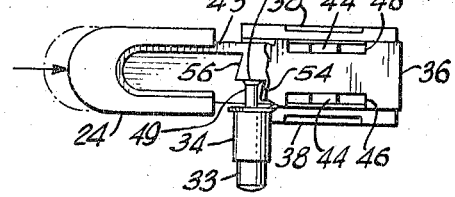
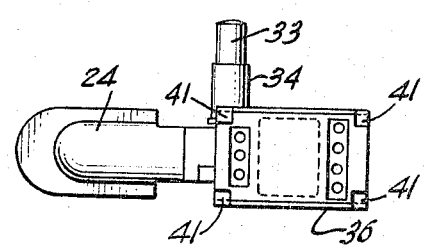
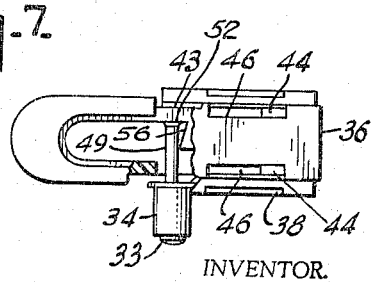
INVENTOR.
EDWARD V. SAHRBACKER
BY
ATTORNEY

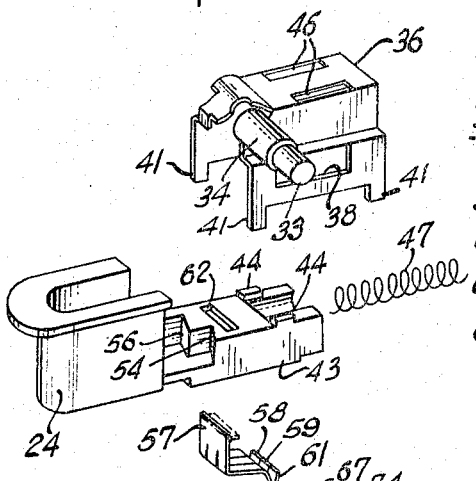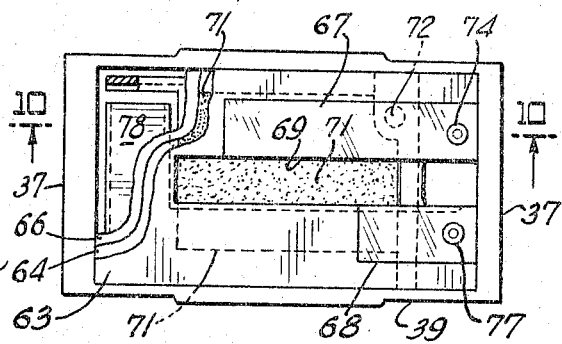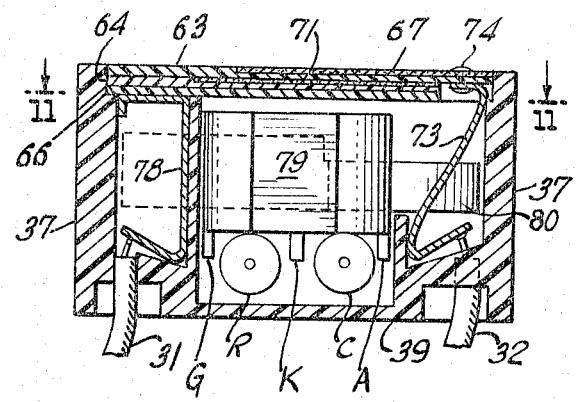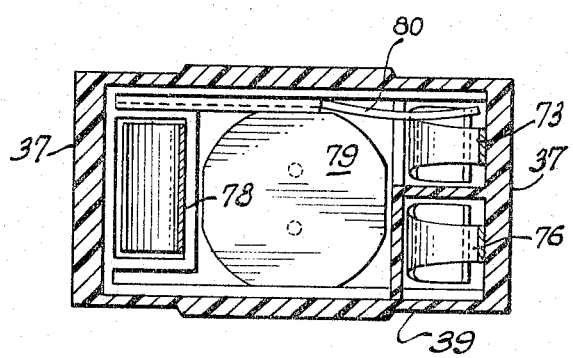

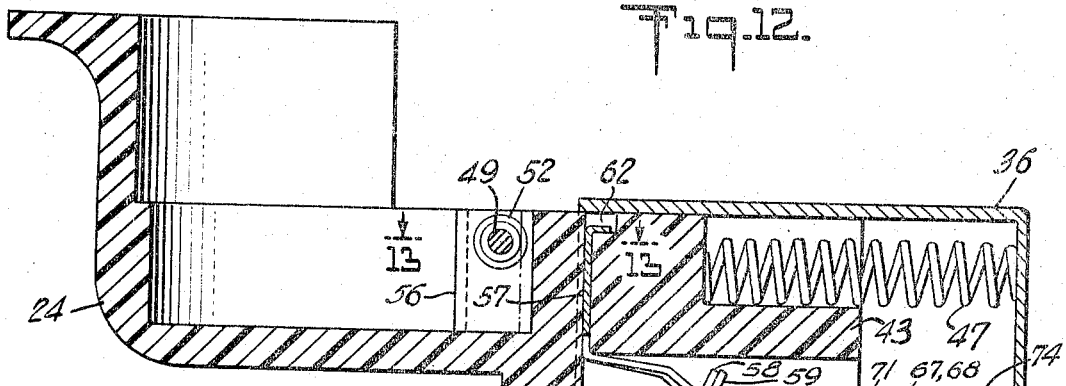
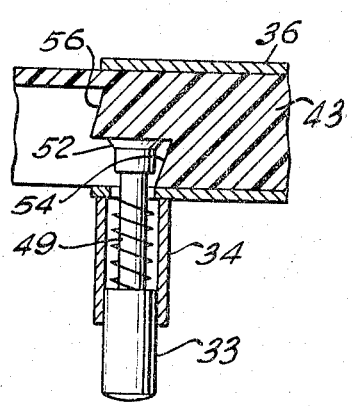
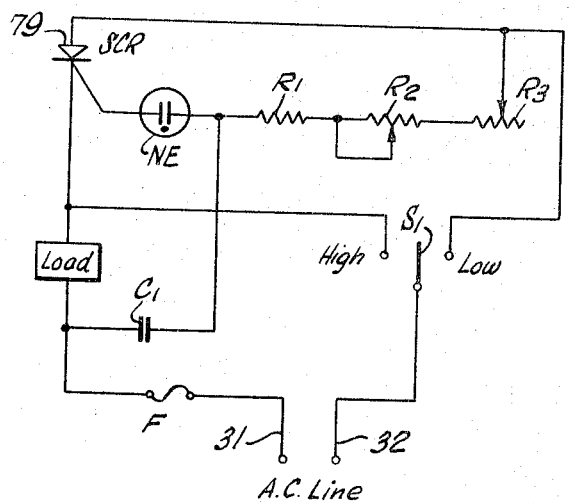
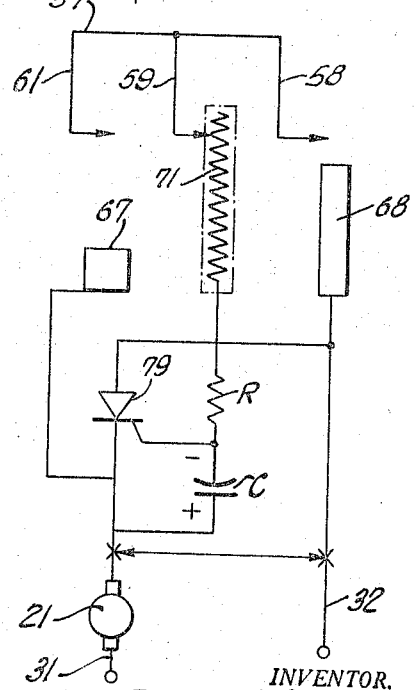
INVENTOR.
EDWARD V. SAHRBACKER
BY
ATTORNEY

United States Patent Office 3,327,196
Patented June 20, 1967

3,327,196
VARIABLE SPEED CONTROL FOR POWER HAND TOOLS AND THE LIKE
Edward V. Sahrbacker, Manchester, Conn., assignor to Carling Electric, Inc., West Hartford, Conn., a corporation of Connecticut
Filed Apr. 1, 1965, Ser. No. 444,723
2 Claims. (Cl. 318—345)

This invention relates to a manual trigger-operated control device for hand-held electric motor driven tools, such as an electric hand drill, or the like, whereby the speed of the motor is continuously variable over a predetermined range under finger control.

This invention is useful for the control of motors and the like powered by an alternating current supply, since it achieves its speed control non-dissipatively by the use of a silicon controlled rectifier (SCR) together with a variable resistance-capacitance circuit which determines the electrical voltage angle at which the SCR will conduct. In this way, the average time during which the motor is energized may be varied so as to effect speed control.

The present invention also teaches an alternative form of its circuitry in which the use of a gaseous discharge resistor provides a more precise determination of the electrical alternating current voltage angle at which the silicon controlled rectifier will fire.

It is an object of this invention to provide a unitary trigger control module which can be incorporated into a wide variety of electric hand tools with a minimum of redesigning and manufacturing retooling.

Another object of the invention is to provide a compact, continuously variable speed control for hand-held electric motors which does not require the use of highly dissipative current limiting impedances.

Still another object of the invention is to provide a speed control design which is rugged, simple to manufacture and assemble, which provides electrical safety, and which is convenient to use and operate.

It is a further object of the invention to provide a control mechanism in which a spring metal slider having three independently cantilevered fingers is made to perform both the speed control and switching functions in response to displacement by a spring biased trigger.

Another object of this invention is to provide a manually operated control for alternating current loads, in which the control voltage to a silicon controlled rectifier is discontinuously applied thereto through a gaseous discharge diode.

Still other objects and advantages of the invention will be apparent from the specification.

The features of novelty which are believed to be characteristic of the invention are set forth herein and will be best understood, both as to their fundamental principles and as to their particular embodiments, by reference to the specification and accompanying drawings, in which:

FIGURE 1 is a side elevation of an electric hand drill in which the trigger control of the subject invention has been incorporated at the location indicated in broken outline;

FIGURE 2 is a somewhat enlarged perspective view of the subject trigger control and its locking detent;

FIGURE 3 is a plan view of the control shown in FIGURE 2, some parts being omitted;

FIGURE 4 is the inverted plan view of the control of FIGURE 2;

FIGURE 5 is a partly broken away side elevation of the control of FIGURE 2;

FIGURE 6 is a view similar to FIGURE 3, partly broken away, wherein the control is locked in the "low speed" position;

FIGURE 7 is a view similar to FIGURE 6, wherein the control is locked in the "high speed" position;

FIGURE 8 is an exploded perspective view of the assembly of the control of FIGURE 2;

FIGURE 9 is a plan view greatly enlarged, of the control box assembly, partly broken away;

FIGURE 10 is a sectional view taken on line 10—10 of FIGURE 9;

FIGURE 11 is a sectional view taken on line 11—11 of FIGURE 10;

FIGURE 12 is a greatly enlarged broken view taken on line 12—12 of FIGURE 2, some parts being in elevation and some parts in dotted outline;

FIGURE 13 is a fragmentary view taken on line 13—13 of FIGURE 12;

FIGURE 14 is an electrical schematic diagram of the subject control circuit;

Figure 15:
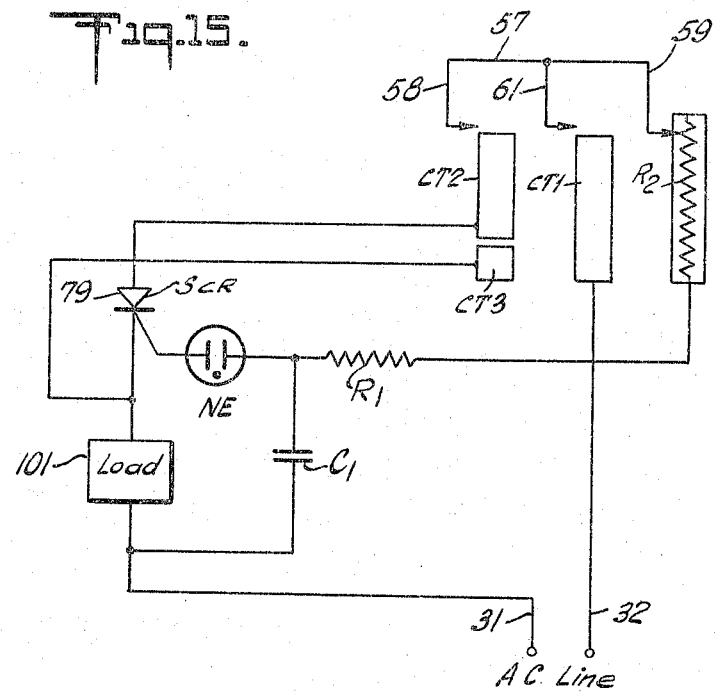
FIGURE 15 is the electrical schematic diagram of a first alternative form of the invention in which the breakdown of a gaseous discharge diode is used to trigger a silicon controlled rectifier, and in which provision is made to bypass said rectifier.
Figure 16:
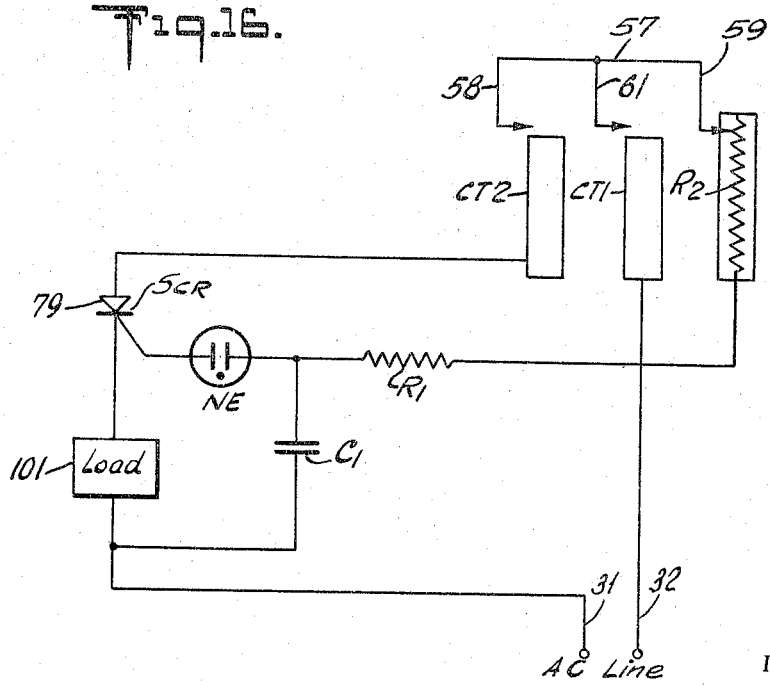

FIGURE 16 is the electrical schematic diagram of a second alternative form of the invention similar to that of FIGURE 15, but in which the bypass provision is omitted; and FIGURE 17 is the electrical schematic diagram of a third alternative form of the invention using a gaseous discharge diode, and particularly adapted to the control not only of motors, but also of heating loads, lighting loads and various types of appliances.

Referring now to the drawings in detail, FIGURE 1 shows a hand drill 21 which has a pistol grip 22 in the interior of which is mounted a control assembly 23 having a trigger control member 24 which is movable in a reciprocating manner through a suitable slot (not shown) in pistol grip 22.

Drill 21 is provided with a gear box 26 and a drill chuck 27. A flexible line cord 28 and plug (not shown) provide connection means to an alternating current electrical outlet.

Cord 28 enters the pistol grip handle 22 through a bushing 29 and terminates in two input wires 31 and 32.

Extending through a suitable aperture in the side of pistol grip 22 is a locking button 33 which is movable axially within a cylindrical guide sleeve 34.

Referring more particularly to the exploded view of FIGURE 8, the assembled control of FIGURES 2 through 7 comprises a sheet metal bracket or frame 36 which embraces and is secured by tab-bending to control case 23 made of a suitable electrically insulating plastic material.

A pair of apertures 38 in bracket 36 snap over corresponding congruent bosses 39 integrally molded in case 37.

In final assembly, four tabs 41, which are integral parts of bracket 36, are bent inwardly into respective accommodating recesses 42 in case 37 to lock the assembly together.

Trigger actuator 24, which is molded of an insulating plastic material, has an integral rearwardly extending guide portion 43 (FIGURE 12) which moves reciprocably within a rectangular tunnel space between bracket 36 and case 37.

Two stop members 44 integral with actuator 24 protrude through corresponding slots 46 in bracket 36 to limit the rectilinear motion of trigger 24. A spring 47, acting between tab 48 integral with bracket 36 and a recessed shoulder of portion 43 of trigger 24, normally urges the latter to its "off" position as seen in FIGURE 12.

The trigger lock mechanism, as shown in FIGURES 6, 7 and 13, comprises a shank portion 49 of reduced diameter on lock button 33, and a coil spring 51, both being located within the interior of guide sleeve 34 which is suitably secured to bracket 36. Shank 49 is flared out at its end to form a detenting flange 52. Trigger 24 is provided with three progressively receding locking steps in the form of undercut notches 53, 54 and 56 which lock trigger 24 in the "off," "low speed," and "high speed" positions, respectively.

The operation of the lock mechanism is as follows: In the "off" position, step 53 abuts pin 49 (FIGURES 3 and 13). When the trigger is manually retracted to the mid-position (FIGURE 6) against the bias of spring 47, button 33 may be depressed against the action of spring 51 until the flange 52 has passed the undercut edge of step 54 as shown in FIGURE 6. If now the trigger 24 is manually released, spring 48 will urge step 54 into forceful contact with flange 52 and shank 49, thereby preventing spring 51 from moving button 33 outwardly. Locking button 33 may now be manually released and the control will continue to be locked in the "slow speed" mode of operation.

When it is desired to unlock the control, momentary retracting pressure is brought to bear on trigger 24 against spring 47, and step 54 moves away from the flange of shank 49 thereby permitting button 33 to move outwardly under the action of spring 51. If finger pressure on trigger 24 is now relaxed, said trigger will move outwardly to the "off" position of FIGURES 3, 12 and 13 under the action of spring 47.

The locking operation for the "high speed" position shown in FIGURE 7 is identical to the foregoing sequence for the "low speed" locking operation with the difference that locking step 56 is substituted for step 54, when trigger 24 is retracted completely against the action of spring 47.

Referring now to FIGURES 8 and 12, a sheet metal slider 57 is provided with three spring contact fingers 58, 59 and 61, and is secured to the insulating trigger body 24 by passing through a slot 62 therein and by being bent over to make it captive to said trigger.

Three insulating plates 63, 64 and 66 are provided and are seated in a sandwich assembly in a recess in the top of insulating plastic box 37.

Top plate 63 is a printed or etched circuit board or the like having two electrically conductive electrode strips 67 and 68 adhesively bonded thereto (FIGURE 9). Strips 67 and 68, which may be plated for resistance to wear and erosion, form commutating and switching electrodes for slider 57 whose finger 58 always rests in spring biased contact with contact electrode 67 except in the "off" position of the trigger, in which position it is separated therefrom. Also, finger 61 of slide 57 presses on insulating plate 63 except in the "high speed" position, where it transfers its pressure to contact electrode 68, thereby electrically connecting electrodes 67 and 68 by means of slide 57.

The middle finger 59 of slide 57 passes through a rectangular aperture 69 in plate 63 and presses upon an electrically resistive strip 71 which is bonded to the upper surface of plate 64, thus forming a continuously variable resistance between a terminal metal foil area 72 also bonded to plate 64 and the central wiping contact finger 59 as it moves over strip 71 under manual control of trigger 24. Electrode 67 is connected to a terminal solder lug 73 by rivet 74 while electrode 68 is connected to a terminal solder lug 76 by rivet 77. A double solder tie point lug 78 is provided as a common floating terminal between the line and motor. A silicon controlled rectifier 79, positioned in case 37, has its anode electrically connected to lug 73 by means of conductive strip 80. All the lugs 73, 76 and 78 are retained in appropriate partitioned wells integral with molded insulating box 37 which is provided with wire access holes for the line and motor leads.

Referring now to the diagram of FIGURE 14, it may be seen that the circuit centers around a silicon controlled rectifier 79 which has an anode A, a cathode K, and a trigger or gate electrode G.

In the "off" position of slider 57, although the series path from line 32, to anode A, to cathode K, to motor 21 and line 31 is present, no current will flow because there is no path between gate electrode G of SCR 79 and line 32 since finger 58 is out of contact with electrode 68.

When the trigger is advanced so that finger 58 first contacts electrode 68, the motor will start running at a very low speed (with the proper choice of circuit values) because a maximum amount of the variable resistor 71 is then in the circuit, thereby causing SCR 79 to start conducting late in the electrical cycle.

As the trigger control 24 is progressively retracted against spring 47, the time constant of the resistor-capacitor circuit including variable resistance 71, fixed limiting resistor R, and fixed capacitor C, will decrease so that SCR 79 will begin conducting progressively earlier in the electrical voltage cycle. The resulting increase in the time during which motor 21 is energized will thus result in a corresponding increase of speed. Finally, when the trigger control 24 is retracted fully it will cause finger 61 to contact electrode 67 thereby completely shorting out SCR 79 and allowing the motor to run at its full speed.

It is to be noted that within the scope of this invention it is possible to arrange the geometry of strip 71 so as to include fixed resistor R as an integral part of strip 71. Also, the three fingers of slider 57 may be made to be a two-finger slider by rearranging resistance strip 71 to be in line with electrode 68.

Referring now to the circuit of FIGURE 15, numeral 57 represents the same three-fingered slider of the preceding figures, and is shown in the "off" position wherein no circuit is closed. As slider 57 is moved away from the "off" position, fingers 61 and 58 of slider 57 bridge the conductive contact elements CT1 and CT2, respectively, thereby connecting the line terminal 32 with the anode of silicon controlled rectifier SCR 79. Simultaneously, connection between finger 61 and contact element CT1 completes the series circuit of variable resistor R2, a fixed protective resistor R1, and a capacitor C1, so that this series circuit forms a voltage dividing network connected across the line terminals 31 and 32.

A gaseous discharge diode NE, such as a miniature $\frac{1}{10}$ watt neon bulb, is connected between the control electrode of SCR 79 and the junction between capacitor C1 and resistor R1. Consequently, at the instant in the alternating current cycle when the voltage drop across C1 is equal to the breakdown voltage of NE, the control electrode or gate of SCR 79 will discontinuously be connected through NE to a potential capable of firing it. Since the potential across C1 at any instant is determined by the ratio of the impedance of C1 to the sum of R1 and R2 multiplied by the instantaneous line voltage, the decrease of R2 as slider 57 is moved away from the "off" position will cause the firing of SCR 79 to take place at progressively earlier phases of the cycle.

The load 101, such as the motor of the hand drill illustrated, is connected between line terminal 31 and the cathode of SCR 79, so that it will receive greater and greater average energization as finger 59 decreases the value of R2. Resistor R1 is provided as a protection to the gate of SCR 79 against excessive voltage regardless of the position of finger 59.

At the extreme "on" position of slider 57, finger 58 transfers from contact element CT2 to a contact element CT3, thereby connecting line terminal 32 directly to load 101 for maximum full wave energization as a result of bypassing SCR 79.

The circuit of FIGURE 16 is identical with that of FIGURE 15 with the exception that contact element CT3 has been omitted, leaving control of the load at all times under R2. This configuration avoids the jump in energization characteristic of the circuit of FIGURES 14 and 15 when passing from half wave to full wave excitation. Since the load of FIGURE 16 will never be subjected to the full unrectified line voltage, the load can be designed with a low enough impedance to give fully energized operation when R2 is a minimum, thereby giving smooth continuous power control over the full range.

The circuit of FIGURE 17 is adapted to be packaged as an appliance control. The principle of operation is identical to that of FIGURE 15, but a series resistor R3 has been added so that R2 is used for coarse adjustment, and R3 is used for fine adjustment.

A separate switch S1 has been added in FIGURE 17 to take the place of members 58, CT2, and CT3 of FIGURE 15. A fuse F may be inserted into the line between the load and the power source.

What is claimed is:

1. A variable speed control for tools or the like, comprising a frame, a trigger movable with respect to said frame, spring means on said frame normally urging said trigger to an "off" position, first and second spaced apart terminals mounted on and insulated from said frame, said first terminal being substantially larger than said second terminal, an elongated strip of resistive film located between and spaced apart from said first and second terminals and in substantially parallel array therewith, said resistive film being at least as long as said first terminal, electrical control circuitry including a silicon controlled rectifier connected between said first terminal and said resistive film strip, an electrically conductive slider mounted upon and movable with said trigger, first, second and third spaced apart electrically conductive contacts on said slider, said first contact being normally spaced apart from said first terminal and said second contact being normally spaced apart from said second terminal when said trigger is in the "off" position, said third contact being engageable with said resistive film, said slider moving with the movement of said trigger against the action of said spring means to cause said first contact to engage and slide along said first terminal throughout the major portion of the movement of said trigger, to cause said third contact to engage and slide along said resistive film coextensively with the engagement of said first contact with said first terminal, and to cause said second contact to engage said second terminal only after said trigger has traversed the major portion of its movement, said engagement of said second contact with said second terminal shorting out the electrical control circuitry between said first terminal and said resistive film strip.

2. A speed control according to claim 1 and further comprising first means on said frame and second means on said trigger, said first and second means being manipulable at will to coact at various positions of said trigger relative to said frame to releaseably lock said trigger in predetermined positions relative to said frame and concomitantly to locate said third contact in fixed relation to said resistive film to establish a desired quantity of resistance in the circuit between said first terminal and said resistive film.

References Cited

UNITED STATES PATENTS 3,209,228    9/1965    Gawron _____ 318—345

OTHER REFERENCES

Electronic Industries, September 1963, p. 116.

ORIS L. RADER, *Primary Examiner.*

J. C. BERENZWEIG, *Assistant Examiner.*